United States Patent [19]
Schott

[11] Patent Number: 4,594,541
[45] Date of Patent: Jun. 10, 1986

[54] SWITCHING REGULATOR USING DUAL SLOPE SAWTOOTH GENERATOR

[75] Inventor: Heinrich Schott, Munich, Fed. Rep. of Germany

[73] Assignee: Siemens Aktiengesellschaft, Berlin & Munich, Fed. Rep. of Germany

[21] Appl. No.: 649,319

[22] Filed: Sep. 11, 1984

[30] Foreign Application Priority Data

Sep. 14, 1983 [DE] Fed. Rep. of Germany ....... 3333223

[51] Int. Cl.[4] ............................................ H02M 3/156
[52] U.S. Cl. .......................................... 323/288; 62/3
[58] Field of Search ...................... 62/3; 323/282, 285, 323/288, 299

[56] References Cited

U.S. PATENT DOCUMENTS 3,377,546 4/1968 Schott ................................. 323/288
4,459,539 7/1984 Cordy ................................. 323/288

FOREIGN PATENT DOCUMENTS 3125528 1/1983 Fed. Rep. of Germany ...... 323/282

Primary Examiner—William H. Beha, Jr.
Attorney, Agent, or Firm—Hill, Van Santen, Steadman & Simpson

[57] ABSTRACT

A switching regulator comprises an electronic switch which can be periodically switched on at prescribed turn-on times with the assistance of a clock generator and can be switched off at a time defined with the assistance of a comparator, whereby the comparator compares an actuating signal to a saw-tooth comparison voltage. Such a switching regulator should operate continuously and accurately given low output powers and at the same time have a stable behavior in the entire control range. To this end, a non-linear chronological progression of the comparison voltage that the chronological change of the comparison voltage decreases in a time segment following the turn-off time. The switching regulator can be employed with particular advantage for the feed of temperature-controlled Peltier elements which serve for cooling laser diodes.

7 Claims, 4 Drawing Figures

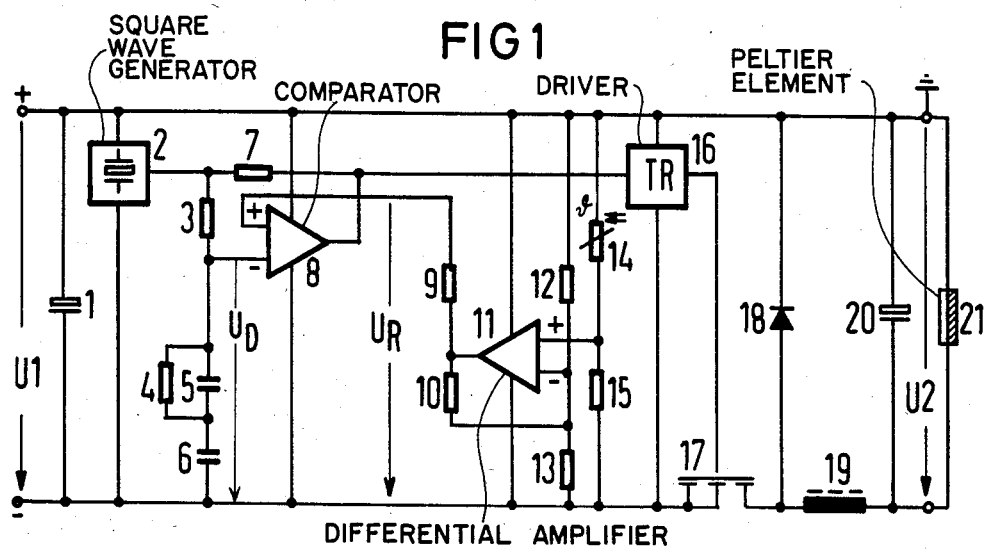
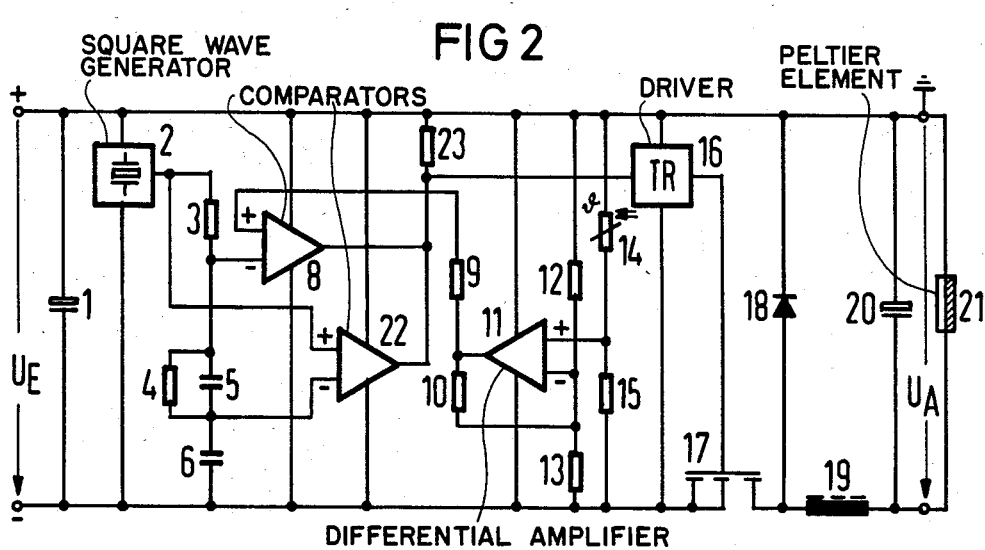

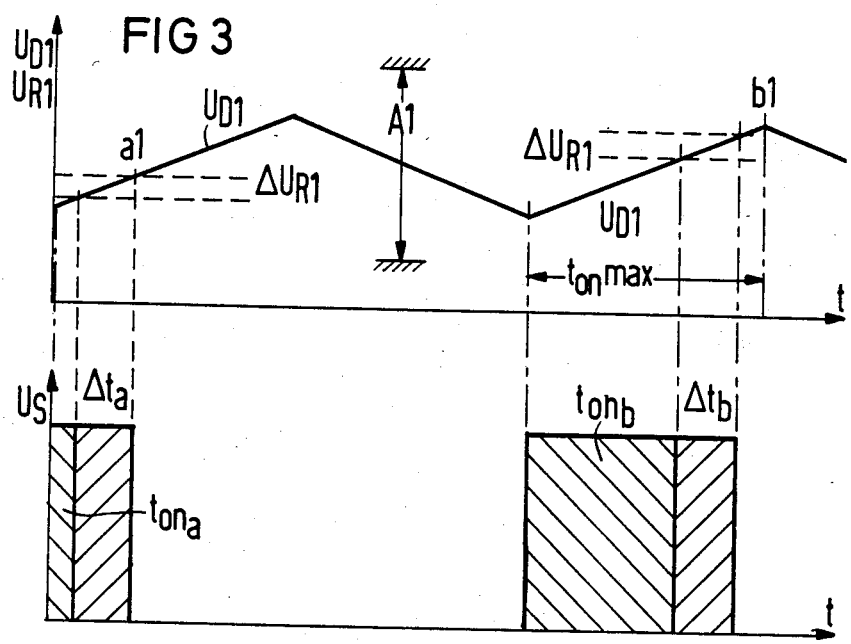
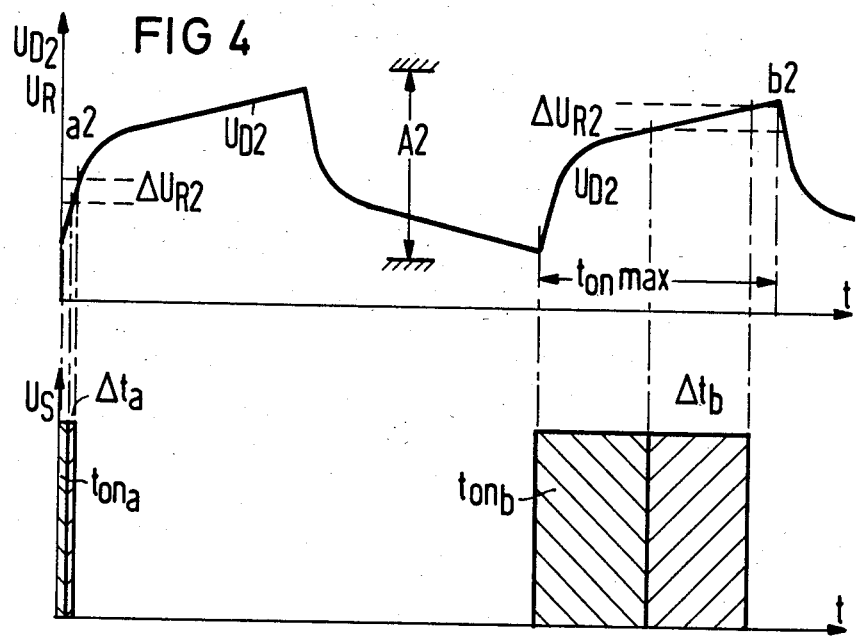

SWITCHING REGULATOR USING DUAL SLOPE SAWTOOTH GENERATOR

BACKGROUND OF THE INVENTION

1. Field of the Invention

The present invention relates to a switching regulator comprising an electronic switch and comprising a differential amplifier whose inputs are supplied with a quantity dependent on an actual value and with a reference value, and comprising a comparator whose inputs are connected to the output of the differential amplifier and to the output of a comparison quantity generator, whereby the comparison quantity generator emits a periodic comparison quantity having a prescribed chronological progression and the electronic switch can be periodically switched on at prescribed on-times with the assistance of a clock generator and can be respectively switched off at a time defined with the assistance of the comparator.

2. Description of the Prior Art

A switching regulator of the type generally set forth above is already known from U.S. Pat. No. 3,377,546, and is fully incorporated herein by this reference.

In a series arm, the known switching regulator contains a switching transistor as a final control element and a control circuit comprising a clock generator, whereby a rectangular control voltage having a constant period and a variable pulse duty factor is generated by super position of a triangular auxiliary voltage with a test voltage. In order to increase the control range of the switching regulator, i.e. the range of adjustment of the pulse duty factor, a trigger circuit generates a rectangular control voltage having high edge steepness (short rise time) which assures a fast switching of the transistor. The working range extends from the one limiting position to the other. The transistor can also be continuously conductive or continuously inhibited.

Given the usual application of a switching regulator for voltage regulation, however, it is not necessary to supply a feed voltage that is continuously variable between a maximum value and zero because either a constant voltage is to be supplied given a finite load resistor or the control voltage value zero need only be reached given the value zero of the load resistor with a short circuit current that is usually equal to or greater than the nominal current.

Investigations within the scope of the present invention have shown, however, that difficulties can arise given a switching regulator which employs a triangular current as a comparison voltage in that a specific constant change of the regulator voltage produces changes that are considerably greater percentage-wise at a low keying degree than at high keying values and that problems with respect to the stability thereof can thereby particularly derive when the gain of the regulating comparator is fixed in the region of high degrees of keying in accordance with the required accuracy.

SUMMARY OF THE INVENTION

It is therefore the object of the present invention to provide a switching regulator of the type generally defined above which works continuously and accurately at low output powers and at the same time exhibits a stable behavior in the entire control range.

The above object is achieved, according to the present invention, in that the switching regulator is designed such that the comparison voltage generator contains a pulse shaper for generating such a non-linear chronological curve of the comparison voltage that the chronological change of the comparison voltage decreases in a time segment following the cut-in time. The influence of the operating point on the efficiency of the regulator is thereby equalized by a non-linear comparison voltage at the regulating converter.

The chronological progression of the comparison quantity is advantageously selected such that a prescribed dependency on the percentage change of the pulse duty factor on a prescribed change of the quantity to be regulated occurs in the overall control range. A prescribed control accuracy can also be advantageously achieved in this manner in the region of low pulse duty factors given continuous operation of the regulator.

According to a further feature of the invention, the comparison value generator comprises a square-wave generator with a pulse shaper connected thereto.

The pulse shaper can be composed of a plurality of RC elements whose outputs are connected in parallel via decoupling diodes so that the desired pulse shape derives by joining the charging curves of a plurality of RC elements or, respectively, superposition of two triangular voltages.

According to a further feature of the invention, the pulse shaper contains a series circuit comprising a resistor, an RC parallel circuit and a further capacitor, so that decoupling diodes are advantageously not required.

The cut-in of the electronic switch by the square-wave generator and the cut-out by the comparator is expediently achieved in that the output of the square-wave generator is connected to the input of the electronic switch via a decoupling resistor and that output of the comparator designed as an open collector output is directly connected to the input of the electronic switch. A field effect transistor (FET) having a preceding driver thereby serves, in particular, as the electronic switch.

According to a further feature of the invention, the switching regulator is designed such that the clock generator for the periodic engagement of the electronic switch contains a comparator whose inputs are connected to the square-wave generator and to an auxiliary voltage source. A necessary compensation of switching times is thereby achieved by an opposed driving of two comparators.

The significant advantage that switching times of the comparator which compares the amplified actuating signal with the comparison quantity are compensated occurs by these measures, so that the advantageous properties of the switching regulator in the region of very small controlled quantities can be fully exploited.

The comparator belonging to the clock generator can receive its auxiliary voltage from a voltage divider that is connected to the input voltage. On the other hand, a particularly advantageous solution provides that the auxiliary voltage source is formed by the capacitor of the series circuit of the pulse shaper.

Given a preferred use of the switching regulator, the user is a Peltier element and the controlled quantity to be kept constant is the temperature of a member coolable by the Peltier element. The particular advantage thereby derives that, given a constant load resistance of the Peltier element, the voltage range proceeding from the value zero can be continuously traversed without a discontinuity.

Given transmitters for message transmission equipment which employ light wave guides as the transmission medium, it can be necessary to cool laser diodes by Peltier elements and to maintain the diodes at a constant temperature via a regulating device which contains a positive temperature coefficient (PTC) resistor as a sensor. In order to achieve as high as overall efficiency of the arrangement as possible, the Peltier element is advantageously fed by a switching regulator as a controlled system. The Peltier element represents the constant load resistor to which a feed voltage continuously variable between a maximum value and zero, must be supplied in accordance with the necessary cooling effect.

The switching regulator also operates faultlessly in an advantageous manner given a low power emission to the Peltier element. It is therefore not necessary to employ a linear transistor regulator for the feed of the Peltier element, the linear transistor regulator, as known, having a poor efficiency.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of a switching regulator having a Peltier element as a load resistor and an arrangement for generating a non-linear comparison voltage;

FIG. 2 is a schematic representation of a switching regulator which proceeding from the basis of the structure of FIG. 1, contains an additional comparator; and FIGS. 3 and 4 are graphic illustrations of the voltage curves at the comparator and at the switching transistor, in particular FIG. 3 being directed to a switching regulator according to FIG. 1, but without an arrangement for generating a chronologically non-linear comparison voltage, and FIG. 4 being directed to a switching regulator according to FIG. 2.

DESCRIPTION OF THE PREFERRED EMBODIMENTS

Referring to the switching regulator of FIG. 1, a storage capacitor 1 is connected to the input. The positive pole of the input is directly connected to the ground positive pole of the output. The negative pole of the input is connected to the negative pole of the output via the drain-source segment of a field effect transistor 17 and via an inductor 19.

A filter capacitor 20 is connected across the output and a Peltier element 21 is connected in parallel thereto as a load resistor. The junction of the field effect transistor and the inductor 19 is connected to ground by way of a free-wheeling diode 18 poled in the conductive direction.

The control electrode of the field effect transistor 17 is connected to a driver circuit 16. The input of the driver circuit 16 is connected directly to the output of a comparator 8.

The comparator 8 is charged with the comparison $U_D$ at its inverting input (−) and is charged with a control voltage $U_R$ at its non-inverting input (+).

The comparison voltage $U_D$ is acquired with the assistance of an RC arrangement connected to the push-pull output of a square-wave generator 2. This RC arrangement is a series circuit comprising a resistor 3, a parallel circuit consisting of the resistor 4 and the capacitor 5, and a capacitor 6. The comparison voltage $U_D$ is fed from the junction of the resistor 3 and the parallel circuit 4, 5 to the inverting input of the regulating converter 8.

The regulator voltage $U_R$ proceeds from the output of a differential amplifier 11 by way of a resistor 9 to the non-inverting input of the comparator 8. The comparator 8 has an open collector output.

The differential amplifier 11 is a feedback operational amplifier. The inverse feedback resistor 10 is disposed between the output and the inverting input. The inverse feedback resistor 10 is disposed between the output and the inverting input. The inverting input of the differential amplifier 11 is connected to the tap of a voltage divider comprising the resistors 12 and 13, the series combination of which is connected across the input voltage U1. The non-inverting input of the differential amplifier 11 is connected to a voltage divider which is also connected across the input voltage U1 and which comprises a temperature sensor 14 and a resistor 15. The temperature sensor 14 is a resistor having a negative temperature coefficient.

The square-wave generator 2, the regulating converter 8, the regulating comparator 11 and the driver 16 have their feed voltage terminals respectively connected to the input voltage U1. The negative pole of the input voltage U1 respectively serves as the reference potential for the regulating converter 8, the regulating comparator 11 and the driver 16.

A buffer module constructed in accordance with complementary metal-oxide-semiconductor (CMOS) technology serves, in particular, as the driver 16.

At its output, the comparator has the condition high-resistance or, respectively, HIGH or low-resistant or, respectively, LOW relative to negative potential.

The square-generator 2 supplies a rectangular voltage having a pulse duty factor or, respectively, pulse pause ratio of about 1:1.

During the pulse pause, negative potential or, respectively, LOW proceeds by way of the resistor 7 and the drive 16 to the field effect transistor 17 so that the same is inhibited.

At the beginning of the positive pulse, turn-on potential proceeds by way of the resistor 7 and the non-inverting driver 16 to the control electrode of the field effect transistor 17.

The output of the comparator 8 is initially HIGH. When the comparison voltage $U_D$ exceeds the regulator voltage $U_R$, then negative potential appears at the output of the comparator 8. Voltage drops off at the resistor 7; the negative potential proceeds by way of the driver 16 to the field effect transistor 17 and inhibits the transistor 17.

The output voltage U2 can be continuously reduced given the switching regulator or, respectively, flow converter according to FIG. 1. The switching regulator is thereby provided for a temperature control for a Peltier element.

When, given this switching regulator, one surveys the RC parallel circuit 4, 5, then a triangular voltage according to FIG. 3 occurs as the comparison voltage $U_{D1}$.

FIG. 3 illustrates the input voltage of the comparator 8 serving as a regulating converter. The amplified actuating signal or, respectively, regulator voltage $U_R{}^1$ supplied by the differential amplifier serving as a temperature regulator can vary within the operating range $A_1$ and completely sweeps the amplitude of the triangular voltage $U_D{}^1$ so that, together with the rest of the control circuit, the corner values of the output voltage U2 between zero and half the input voltage U1 occurring, given a keying degree of 0.5 are entirely possible. Given a low degree of keying, however, a specific, uniform change of the regulator voltage $U_R{}^1$ causes, on a percentage basis, considerably greater changes at the operating point a1 then given an operating point b1 corresponding to a higher degree of keying. The consequence is instability given low cooling power when the amplification of the differential amplifier 11 is fixed in accordance with the required accuracy given high cooling power.

When the regulator voltage $U_R{}^1$ enters into the range of the triangular voltage $U_{D1}$ from below, then the comparator 8 begins to work and effects the shutdown of the field effect transistor 17 via the resistor 7 and the driver 16. Its switching time amounts to, for example, about 0.4 µs. Given an operating frequency of 100 kHz and an input voltage of 9 V, for example, this means that the voltage at the Peltier element 21 suddenly jumps from zero to about 0.35 V. When less power is required, an intermittent mode with a period corresponding to the high thermal time constant is set. This, for example, can lie in the second range. The regulator voltage oscillates with a corresponding frequency because the measured temperature exhibits constant fluctuations as well. Due to a type of hysteresis, only a significant rise in the required cooling power again leads to stable operation.

Given the switching regulator with the RC parallel circuit 4, 5 illustrated in FIG. 1, the excessive sensitivity below a low degree of keying is eliminated by a non-linear curve of the comparison voltage at the comparator 8. The non-linear comparison voltage $U_{D2}$ according to FIG. 4 is achieved by the series connection of the low time constant RC element 4, 5 to the integration capacitor 6 at which a largely linear voltage change continues to be given.

The resistor 3 serves as a charging resistor for the capacitors 5 and 6. The capacitor 5 is first charged with a relatively small time constant which is given by the time constant of the RC element 3, 5. The time constant of the RC element 3, 4, 6 is effective over the further course of the comparison voltage $U_{D2}$. In particular, this time constant is greater than the smaller time constant of the RC element 3, 5 by about the factor 20. The ratio of the resistors 3 and 4 defines a voltage division from which the amplitude of the voltage at the capacitor 5 occurs.

The overall voltage or, respectively, nonlinear comparison voltage $U_{D2}$ enables an optimization of the gain of the differential amplifier 11 which guarantees the required accuracy given stability in the overall operating range A2.

The switching regulator or, respectively, flow converter according to FIG. 2 largely coincides with that according to FIG. 1. Departing from FIG. 1, the resistor 7 is replaced by a resistor 23 disposed between the positive pulse of the input voltage $U_E$ and the input of the driver 16. A comparator 22 is also provided in addition to the comparator 8. The additional comparator 22 has its inverting input connected to the junction of the RC parallel circuit 4, 5 with the capacitor 6. The non-inverting input of the comparator 22 is connected to the output of the square-wave generator 2.

Both of the comparators 8 and 22 have their supply voltage inputs connected at the input voltage $U_E$. Also, both comparators 8 and 22 have an open collector output. The parallel connection of the outputs of the comparators is connected directly to the input of the driver 16.

Whereas the cut-through of the field effect power transistor 17 of the circuit of FIG. 1 occurs directly in the square-wave generator 2 serving as a clock generator via the resistor 7 and the driver 16, but the inhibit occurs via the comparator 8, the turn-on of the switching regulator according to FIG. 2 is undertaken via the resistor 23 and the additional comparator 22. Both of the comparators 8 and 22 are advantageously integrated circuits which are components of one and the same chip.

The comparators 8 and 22 have the high-resistance condition or, respectively, HIGH or the low-resistance condition relative to negative potential or, respectively, LOW at the output. When both comparators 8 and 22 are high-resistant at the output, then turn-on potential proceeds via the resistor 23 and the driver 16 to the control electrode of the field effect transistor 17. When one of the two comparators 8 and 22 is in a low-resistance condition, with respect to negative potential at its output, then inhibit potential extends to the field effect transistor 17 via the driver 16.

The comparator 22 emits inhibit potential LOW at its output during the inhibit phase of the switching regulator, i.e. during the pulse pause at the output of the square-wave generator. At the beginning of the positive rectangular pulse at the output of the square-wave generator 22, the comparator 22 switches from the LOW state to the HIGH state and switches on the field effect transistor 17. The transistor 17 remains on until the comparison voltage $U_{D2}$ at the inverting input of the comparator 8 has risen to the value of the regulator voltage $U_{R2}$, so that the comparator 8 is transferred to the , so that the comparator 8 is transferred to the LOW state at its output that inhibits the field effect transistor.

As proceeds from FIG. 4, the comparison voltage beginning at its minimum voltage, first rises steeply in the lower third of the first half period and then changes to a roughly linear curve with a slight slope. The second half period begins with a steep drop in the first third which then changes into a linear region with a small negative slope. The duration of the first half period is equal to the maximum on time $t_{on\ max}$ of the electronic switch. The percentage change of the on time $t/t_{on}$ is roughly the same size for the operating points a and b.

When the regulator voltage enters the range of the modified triangular voltage $U_{D2}$ according to FIG. 4 from below, then the change of the output of the comparator 22 from LOW to HIGH and of the output of the comparator 8 from HIGH to LOW are initiated simultaneously with the transition of the output of the square-wave generator 22 from LOW to HIGH.

The passive transition of the comparator 22 from LOW to HIGH necessarily proceeds somewhat slower than the active transition of the comparator 8 from HIGH to LOW. A compensation in the component itself which does not depend on additional tolerances of external components is therewith provided.

The switching regulator illustrated in FIG. 2 therefore enables a continuous power emission to the Peltier element without discontinuity and proceeding from value zero.

A member which carries a laser diode is cooled with the assistance of the Peltier element. The temperature of the cooled member is measured with the assistance of the temperature-dependent resistor 14. When the temperature of the member to be cooled rises, then the value of the resistor 14 becomes smaller and the non-inverting input of the differential amplifier 11 receives a potential that is shifted to its positive values. The feedback resistor 10 likewise boosts the potential at the inverting input somewhat in the direction toward positive voltages. The potential at the non-inverting input of the comparator 8 is likewise shifted in the positive direction so that more time elapses until the comparison voltage $U_D{}^2$ has risen in its chronological progression to the value of the regulator voltage $U_R{}^2$ and initiates the comparator 8 to turn off the switching transistor 17.

The Peltier element 21 represents a constant load resistor whose power is controlled as a function of a temperature. Given other applications of the switching regulator, the speed of a fan motor is controlled as a function of a temperature or the torque of a dc motor serving drive purposes is controlled as a function of the tensile stress of a thread moved by the motor or the brightness of a lamp is regulated.

The following integrated circuits are employed, for example, as the circuit elements 2, 8, 22, 11 and 16:

Square wave generator 2—TDB 0555;
Comparator 8 and comparator 22—LM 393;
Differential amplifier 11—½ LM 358; and
Driver circuit 16—4050 B.

The pulse shaper 1 . . . 6 is, for example, dimensioned as follows:

Resistor 3—4.3 k;
Resistor 4 1.8 k;
Capacitor 5—150 pF; and
Capacitor 6—3.3 nF.

Although I have disclosed my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A switching regulator comprising:
an input for receiving a voltage to be regulated, and an output;
first voltage means connected to said input for producing a reference voltage;
second voltage means connected to said input for producing a voltage dependent on the value of the voltage to be regulated;
a differential amplifier including a pair of inputs respectively connected to said first and second voltage means;
an electronic switch connected between said input and said output;
a comparison voltage clock generator, including a pulse shaper, operable to emit a clocked comparison voltage having a prescribed non-linear chronological progression for switching on said electronic switch at predetermined turn-on times and decreasing in time intervals following the turn-on times; and
a comparator including an output connected to said electronic switch and a pair of inputs respectively connected to said pulse shaper and said differential amplifier and operable to turn off said electronic switch when the clocked comparison voltage reaches a predetermined value following a turn-on time.

2. The switching regulator of claim 1, wherein:
said comparison voltage clock generator comprises a square-wave generator connected to said pulse shaper.

3. The switching regulator of claim 2, wherein:
said pulse shaper comprises a series circuit including a first resistor, a first capacitor and a third capacitor, and a second resistor connected in parallel with said first capacitor.

4. The switching regulator of claim 2, and further comprising:
a resistor connecting said square-wave generator to said electronic switch; and wherein
said comparator comprises an open collector output directly connected to said electronic switch.

5. The switching regulator of claim 2, wherein:
said comparison voltage clock generator further comprises a further comparator including an output connected to said electronic switch and a pair of inputs respectively connected to said square-wave generator and an auxiliary voltage source.

6. The switching regulator of claim 5, wherein
said pulse shaper comprises a series circuit including a first resistor, a first capacitor and a second capacitor, and a second resistor connected in parallel with said first capacitor, said second capacitor connected to said further comparator and serving as the auxiliary voltage source.

7. The switching regulator of claim 1, and further comprising:
a Peltier element connected to said output for controlling the temperature of an operating device.

* * * * *